United States Patent [19]

Ball et al.

[11] 4,012,013
[45] Mar. 15, 1977

[54] VARIABLE CAMBER INLET FOR SUPERSONIC AIRCRAFT

[75] Inventors: William Henderson Ball; Kichio Keith Ishimitsu, both of Mercer Island, Wash.

[73] Assignee: The Boeing Company, Seattle, Wash.

[22] Filed: Feb. 5, 1976

[21] Appl. No.: 655,329

[52] U.S. Cl. .............................. 244/53 B; 137/15.1; 244/44

[51] Int. Cl.² ....................................... B64D 33/02

[58] Field of Search ........... 244/53 B, 44; 137/15.1, 137/15.2

[56] References Cited
UNITED STATES PATENTS

| | | | |
|---|---|---|---|
| 3,032,977 | 5/1962 | Neitzel | 137/15.1 X |
| 3,242,671 | 3/1966 | Moorehead | 137/15.1 |

Primary Examiner—Trygve M. Blix
Assistant Examiner—Barry L. Kelmachter
Attorney, Agent, or Firm—Mark J. Zovko, Jr.

[57] ABSTRACT

An inlet for a supersonic aircraft capable of varying capture area. The inlet is of a rectangular shape, and has a ramp attached to the top and bottom of its fore end. The ramps are positioned to maximize air capture area during supersonic flight. At subsonic speeds, the ramps are moved to a position which slightly reduces the capture area. The ramps may have a blunt edge or sharp edge, and are controlled by an actuator located within the aircraft and connected to the ramps by suitable linkage. The ramps have a smooth contour provided by a flexible outer skin to reduce aerodynamic drag during operation of the aircraft.

2 Claims, 9 Drawing Figures

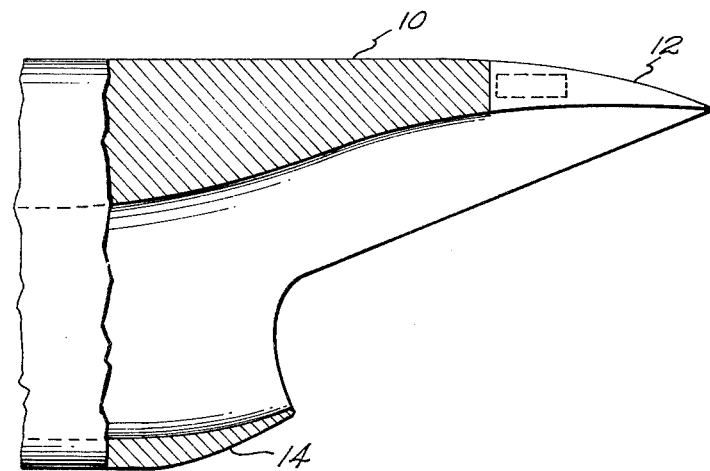
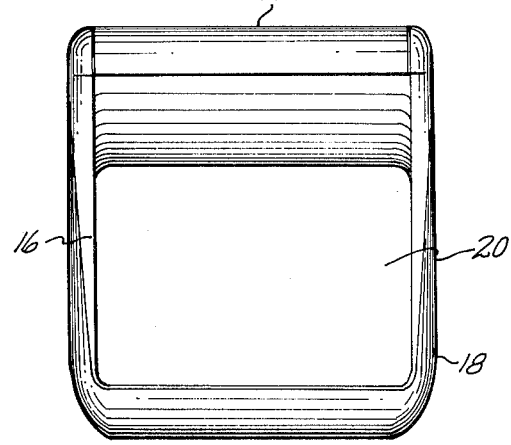
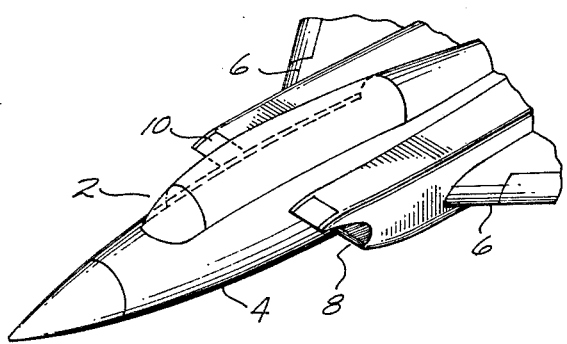
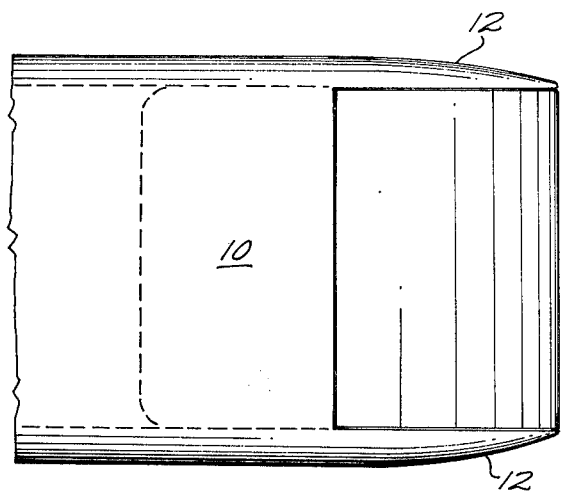
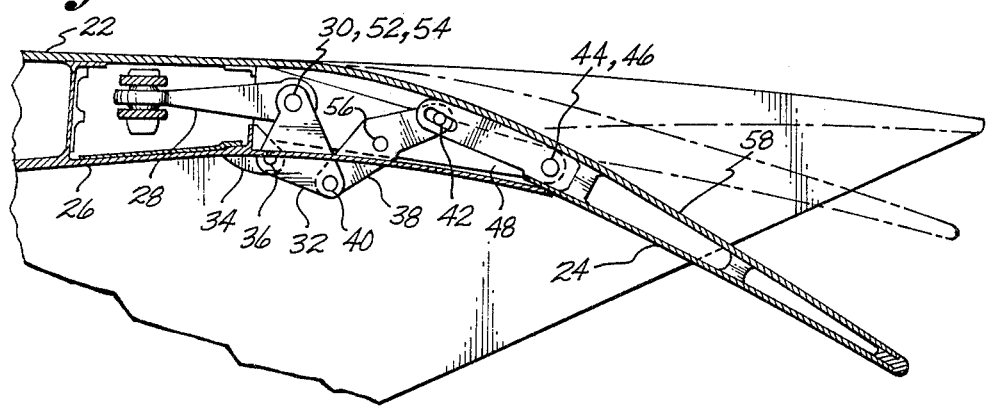

VARIABLE CAMBER INLET FOR SUPERSONIC AIRCRAFT

BACKGROUND OF THE INVENTION

1. Field of the Invention

This invention relates to an inlet for an aircraft engine, and more particularly to a variable camber inlet for a supersonic aircraft engine.

2. Discussion of the Prior Art

Modern jet-powered aircraft that are built to fly at supersonic speeds usually incur problems at subsonic speeds. The aircraft suffer a severe penalty in efficiency due to the sizing of the air inlets to the engine. The capture area of the air inlet must be made large enough to supply the amount of air required by the engine for supersonic operation. At the lower subsonic cruise flight condition, a large capture area is not required to meet the demands of the engine. The excess airflow spills around the air inlet and results in a drag penalty. The increase in drag reduces the effective range of the aircraft, and inhibits its ability to carry out a given mission.

The prior art discloses the basic concept of providing aircraft engine inlets with a variable camber leading edge to accommodate various flight conditions and provide efficient operation during subsonic operation.

A search of the prior art relating to the particular field of the invention discovered the following United States patents:

| Reference | Inventor(s) | Issue Date | Classification |
|---|---|---|---|
| (1) 2,934,288 | MacINTYRE | 4-26-60 | 244/44 |
| (2) 3,074,232 | SOYER | 1-22-63 | 244/44 |
| (3) 3,494,380 | MARTIN | 2-10-70 | 137/15.1 |
| (4) 3,532,129 | WARD, et al. | 10-6-70 | 137/15.1 |
| (5) 3,589,379 | DAVES, et al. | 6-29-71 | 137/15.1 |
| (6) 3,611,724 | KUTNEY | 10-21-71 | 137/15.1 |
| (7) 3,618,699 | EVANS, et al. | 11-9-71 | 137/15.1 |
| (8) 3,659,418 | POUCHER, et al. | 5-2-72 | 137/15.1 |
| (9) 3,664,612 | SKIDMORE, et al. | 5-23-72 | 244/53 |
| (10) 3,763,874 | WILDE, et al. | 10-9-73 | 137/15.1 |

References (1) through (4), and (6) through (10) apply to relatively low speed operation of subsonic aircraft. References (1), (2), (3), (6) and (7) disclose inflatable devices for varying camber in an aircraft engine useful in subsonic aircraft. Reference (8) discloses a device for improved diffuser efficiency by the use of wall vortex flow, and has no similarity in function or structure to the present invention. Reference (4) discloses a device to reduce the throat area of a subsonic aircraft inlet at low speeds, such as during approach, landing and taxi. The objective of this invention is noise reduction due to choking the flow of air through the engine throat. Further, the device is disclosed for use with a circular inlet, and not a rectangular inlet.

Reference (10) discloses a mechanical device for increasing the contraction ratio of the inlet lip. This device corrects the problems of distortion due to crosswind operation of a subsonic aircraft inlet at very low speeds such as during takeoff, landing and taxi. The device does not teach utility at supersonic speeds.

Reference (9) discloses a variable highlight inlet for an aircraft engine. This invention applies to only circular inlets and limits its teachings to subsonic conditions.

In reference (5), U.S. Pat. No. 3,589,379, Daves, et. al., a complete inlet duct for a supersonic aircraft is disclosed. The inlet duct incorporates a rocking ramp on its upper forward edge. The rocking ramp pivots about a center point to provide a variation in the ratio of inlet capture area to throat area. The purpose of the ramp is to reduce the inlet throat area at supersonic speeds. A ramp is not attached to the lower forward edge as in the present invention. Further, the ramp disclosed in U.S. Pat. No. 3,589,379 is a solid structure which does not change its shape during pivoting, and lacks correct external aerodynamic shape which provides good streamline matching for all flight regimes.

SUMMARY OF THE INVENTION

The invention comprises a variable camber rectangular inlet for use with a supersonic aircraft engine. The inlet has means for varying its capture area which comprises a first ramp mounted to the top forward edge of the inlet, a second ramp mounted to the bottom forward edge of the inlet, and an actuating system for varying the position of the ramps thereby changing the inlet capture area. In one embodiment of the invention, the ramps have three portions, a fore portion, a middle portion, and an aft portion. The fore portion can pivot relative to the middle portion, and the middle portion can pivot relative to the aft portion. Preferably, the outer surface of the ramps is a flexible skin so as to give a smooth contour to the surface and minimize aerodynamic drag when the different portions are pivoted to reduce the inlet capture area.

An object of the invention, therefore, is to provide a variable camber inlet device for a supersonic aircraft engine which maximizes engine efficiency by varying the capture area at subsonic and supersonic speed.

Another object of the invention is to provide a device for reducing capture area of a supersonic aircraft engine inlet which minimizes aerodynamic drag.

A further object of the invention is to provide a device for reducing the capture area of a supersonic aircraft engine inlet which is relatively simple, efficient, and light in weight.

These objects will become more apparent from the following detailed discussion when taken in conjunction with the drawings.

BRIEF DESCRIPTION OF THE DRAWINGS

FIG. 1 is a fragmented perspective view of a supersonic aircraft fitted with the inlet of the present invention.

FIG. 2 is a side view of an inlet for a supersonic aircraft in accordance with the invention.

FIG. 3 is a front view of the inlet of FIG. 1.

FIG. 4 is a top view of the inlet of FIG. 1.

FIG. 5 is a sectioned side view of a sharp edged ramp in accordance with the invention.

DETAILED DESCRIPTION OF THE PREFERRED EMBODIMENT

Figure 6:
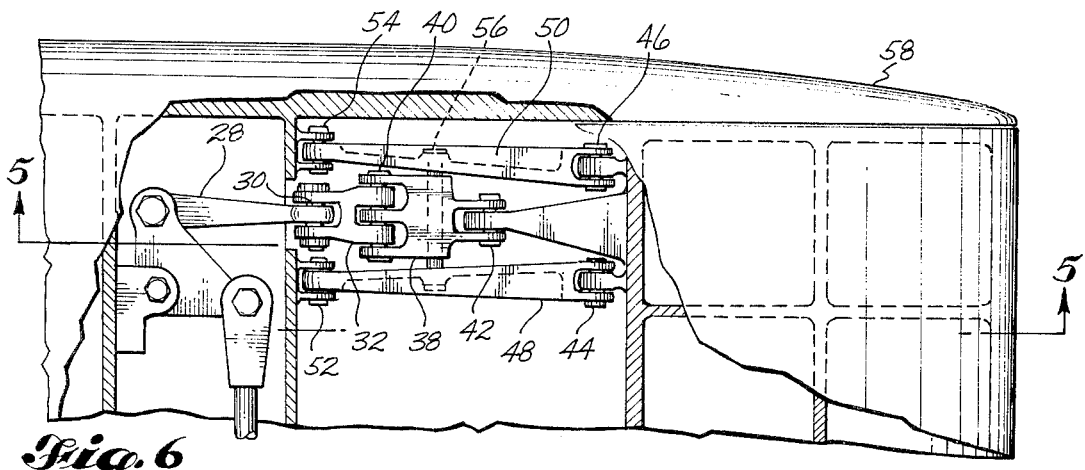
FIG. 6 is a fragmented top view of the sharp edged ramp of FIG. 4.

Referring to FIG. 1, a fragment perspective of a supersonic aircraft in accordance with the present invention is shown. The aircraft generally designated as 2 has a fuselage 4, wings 6 and inlets to the jet engines designated as 8 and 10. The invention will be described for one inlet only, since inlets 8 and 10 are identical in all respect and are located on each wing 8.

Referring to FIGS. 2 and 3, the inlet 10 is rectangular in shape having an upper ramp 12 connected to the upper forward edge of inlet 10, and a lower ramp 14 connected to the lower forward edge of inlet 10. Walls 16 and 18 form the sides of the rectangular inlet. In FIG. 2 ramps 12 and 14 are positioned for supersonic flight, and are fitted to form a smooth contour with the upper and lower forward edges of inlet 10. The upper and lower ramps 12 and 14, along with walls 16 and 18 form a rectangular capture area designated as 20. The capture area 20 is the area used for capturing incoming air into the jet engine (not shown) during the operation of aircraft 2. The ramps 12 and 14 are positioned in FIG. 2 for a maximum capture area for incoming air, as required during supersonic flight.

The ramps 12 and 14 may be adjusted to a new position, and a new capture area 20 for use during subsonic flight. The mechanism for adjusting ramps 12 and 14 to produce a smaller capture area is shown in FIGS. 5 and 6. The upper ramp 12 only is shown in these figures for purposes of illustration. The lower ramp 14 in this embodiment would have an identical mechanism. The lip shown in FIGS. 5 and 6 is a sharp lip. The mechanism for a blunt lip will be described subsequently. A sharp lip ramp, capable of varying its camber, is generally designated as 22 in FIG. 5. Sharp lip ramp 22 has a fore portion 24 designated as a leading edge beam, and an aft portion 26 mounted to the inlet of the jet engine (not shown). A push rod 28 partially disposed in the aft portion 26 is connected at one end to suitable actuating means (not shown) such as a standard hydraulic actuator. The other end of rod 28 is connected by connector 30 to an actuation lever 32. Lever 32 is linked to a support fitting 34 by connector 36. Support fitting 34 is suitably mounted within the aft portion 26 of the ramp 22. Lever 32 is also connected to support lever 38 by connector 40. The other end of support lever 38 is connected by connector 42 to the leading edge beam 24. The leading edge beam 24 is also connected by connectors 44 and 46 to a pair of support fittings 48 and 50. Support fittings 48 and 50 are mounted to the aft portion 26 of the ramp 22. Mounting means 52 and 54, respectively, are used to mount the support fittings 48 and 50 to the aft portion 26. The support fittings 48 and 50 are interconnected by a pin 56, which runs through support lever 38. Fittings 48 and 50 are able to pivot about mounting means 52 and 54, and the leading edge beam 24 can pivot about connectors 44 and 46. A flexible cover designated as 58, is provided to cover the outer surfaces of ramp 22. The cover 58 can be of any flexible material, and maintains a smooth upper surface on ramp 22 when the ramp is actuated to a reduced capture arc position.

In operation, the sharp inlet ramp 22 is activated by a signal from suitable actuating means. The signal would be generated when the aircraft is changing from supersonic operation which requires a maximum capture area to a subsonic flight regime. To reduce the capture area, actuating means (not shown) would move push rod 28 so as to push against the upper pivot point of actuation lever 32. The pivot point of actuation lever 32 is located at connector 30. The lever 32 rotates about connector 30 in a clockwise direction. The rotation of lever 32 in a clockwise manner causes support lever 38 to rotate in a counter-clockwise direction about pin 56. As the support lever 38 is rotated, the leading edge beam 24 is caused to pivot about a horizontal line running through connectors 44 and 46. Leading edge beam 24 is thereby moved downward, reducing the inlet capture area. Flexible cover 58 gives a smooth contour to the upper surface of ramp 22 regardless of the position of the ramp 22.

Figure 7:
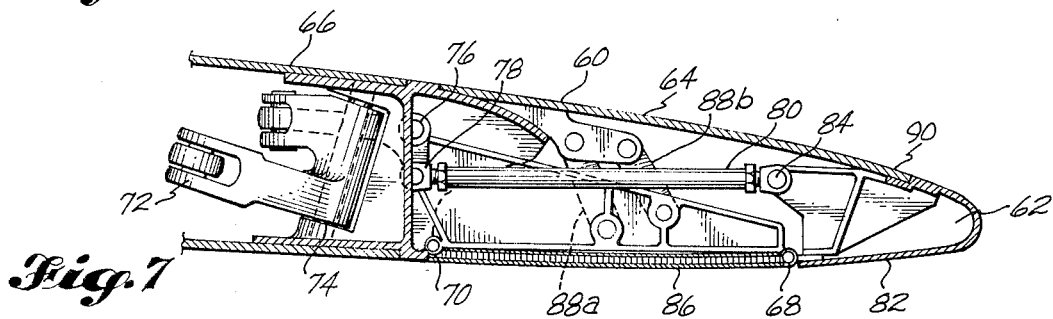
FIG. 7 is a sectioned side view of a blunt edged ramp in accordance with the invention showing its position for maximum capture area.
Figure 8:
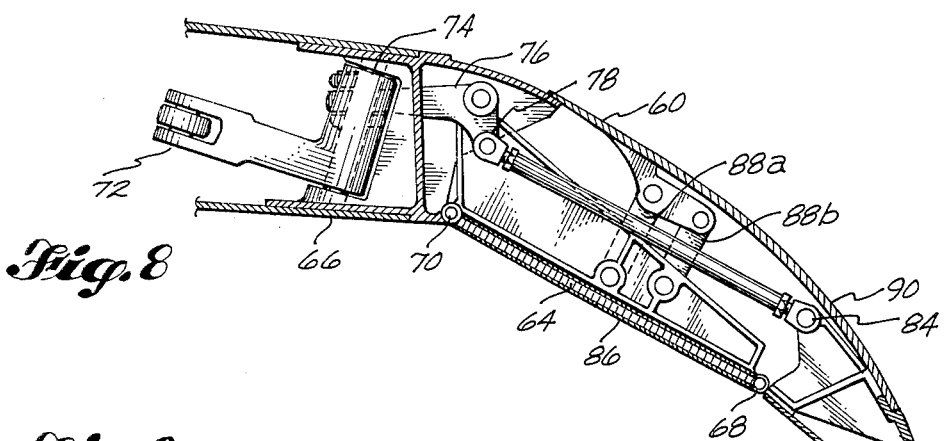
FIG. 8 is a sectioned side view of a blunt edged of FIG. 6 showing its position for reduced capture area.
Figure 9:
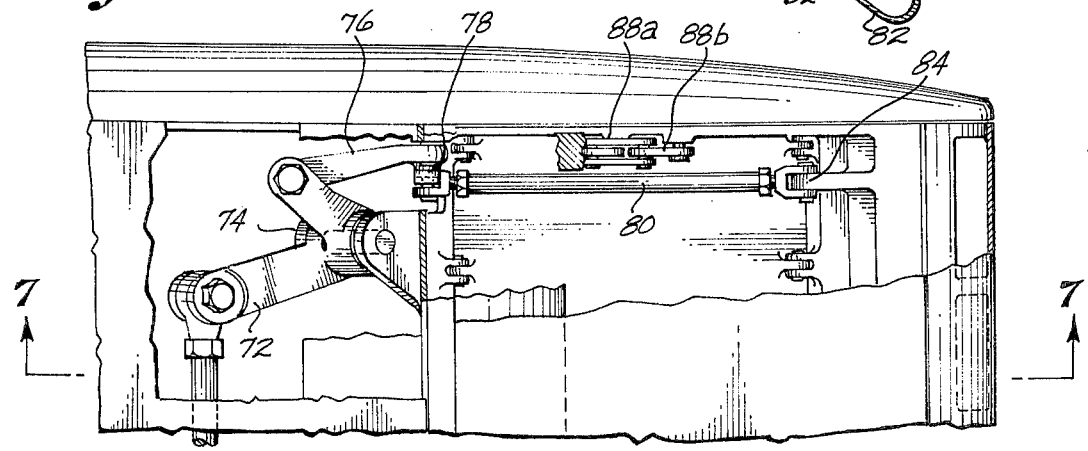
FIG. 9 is a fragmented top view of the blunt edged ramp of FIG. 6.

Another embodiment of a ramp for use in the inlet 10 and having a blunt leading edge is shown in FIGS. 7 through 9. A blunt ramp generally designated 60 has three portions, a fore portion 62, a middle portion 64 and an aft portion 66. The fore portion 62 can be pivoted about line 68, and the middle portion about line 70. The mechanism used for operating the blunt inlet ramp 60 can be any conventional system allowing pivoting of the fore portion 62 about line 68, and allowing pivoting of the middle portion about line 70. The system shown in FIG. 7 through 9 consists of an actuator (not shown) connected to a suitable power source. The rod of the actuator is connected to a bell crank 72 which in turn is connected through connecting means 74 to drive link 76. Connecting means 78 links drive link 76 with a push rod 80. The push rod 80 is connected to a leading edge beam 82 located in the fore portion 62 of the ramp by connecting means 84. A lower support beam 86 is located between pivot lines 68 and 70, and serves as the support for the middle portion 64 of the ramp. Panel links 88a and 88b connect the upper flexible skin 90 of middle portion 64 with the support beam 86. The flexible skin 90 extends from the fore portion 62 to the aft portion 66 on the upper side of ramp 60, giving the ramp a smooth contour after the fore portion 62 and middle portion 64 are pivoted about lines 68 and 70 respectively.

In operation, to maximize the capture area of the inlet, the blunt edged ramp is positioned as shown in FIG. 7. The fore, middle, and aft portions are essentially in a straight line with no pivoting about lines 68 or 70. This position is used while the aircraft is in supersonic flight. To reduce the capture area for subsonic flight, the crank 72 is activated by movement of an actuator (not shown) and pushes drive link 76 forward. As drive link 76 is pushed forward, rod 80 is also moved forward causing the leading edge beam 82 to rotate about pivot line 68. The lower support beam 86 in turn rotates about pivot line 70. Both beams 82 and 86 are slightly moved forward up movement of rod 80. Flexible skin 90 conforms to the movement of the fore portion 62 and middle portion 64 of the ramp and provides a smooth contour to the outer surface of the ramp. Aerodynamic drag, therefore, is decreased when a reduced capture area is employed for subsonic flight.

We claim:
1. In a rectangular cross sectioned air inlet for an engine operatively associated with a supersonic aircraft, the air inlet having an outer surface exposed to ambient air and an inner surface forming the primary passageway for intake of air to the engine, and means for varying the capture area of the primary passageway comprising, a. a first ramp mounted to the top forward edge of the inlet, said first ramp having three portions, a fore portion, a middle portion, and an aft portion, the fore portion pivotally mounted to the middle portion, the middle portion pivotally mounted to the aft portion, and, the aft portion mounted to the inlet so that the fore portion can pivot relative to the middle portion, and the middle portion can pivot relative to the aft portion;

b. a second ramp mounted to the bottom forward edge of the inlet, said second ramp having three portions, a fore portion, a middle portion, and an aft portion, the fore portion pivotally mounted to the middle portion, the middle portion pivotally mounted to the aft portion and, the aft portion mounted to the inlet so that the fore portion can pivot relative to the middle portion, and the middle portion can pivot relative to the aft portion;

c. actuating means mounted to the inlet for varying said first and second ramps from first positions used when the aircraft is in subsonic flight to second positions used in supersonic flight whereby the capture area of the primary passageway is increased; and d. pivoting means for pivoting the fore and middle portions of said ramps relative to each other and the aft portion, said pivoting means being mounted within said ramp and connected to said actuating means.

2. The apparatus of claim 1 wherein the outer surface of said first and second ramps is a flexible skin so as to give a smooth contour to the surface of said ramps and minimize aerodynamic drag during the operation of the supersonic aircraft.

* * * * *